US012006825B2

(12) United States Patent
Kenno

(10) Patent No.: US 12,006,825 B2
(45) Date of Patent: Jun. 11, 2024

(54) CUTTING TOOL WITH SHANK PORTION CONFIGURED FOR LIMITING ROTATION AND CONTROLLING ORIENTATION OF THE TOOL

(71) Applicant: Kennametal Inc., Latrobe, PA (US)

(72) Inventor: Brandon J. Kenno, Bedford, PA (US)

(73) Assignee: KENNAMETAL INC., Latrobe, PA (US)

( * ) Notice: Subject to any disclaimer, the term of this patent is extended or adjusted under 35 U.S.C. 154(b) by 570 days.

(21) Appl. No.: 17/198,856

(22) Filed: Mar. 11, 2021

(65) Prior Publication Data

US 2022/0288704 A1 Sep. 15, 2022

(51) Int. Cl.
*E21C 35/197* (2006.01)
*B28D 1/18* (2006.01)
*E21C 35/19* (2006.01)

(52) U.S. Cl.
CPC ............ *E21C 35/197* (2013.01); *B28D 1/188* (2013.01); *E21C 35/19* (2013.01)

(58) Field of Classification Search
CPC ..... B28D 1/188; E21C 35/1831; E21C 35/19; E21C 35/191; E21C 35/1933; E21C 35/197; E02F 9/2841
USPC ........ 299/107, 102, 103, 106, 109, 110, 113
See application file for complete search history.

(56) References Cited

U.S. PATENT DOCUMENTS 4,149,753 A * 4/1979 Stoltz .................... E21C 35/197 299/107
4,247,150 A 1/1981 Wrulich et al.
4,603,911 A 8/1986 Hindmarsh
4,684,176 A 8/1987 Den Besten et al.
4,921,310 A 5/1990 Hedlund et al.
5,628,549 A * 5/1997 Ritchey ................. E21C 35/197 299/107
6,375,272 B1 4/2002 Ojanen
D627,804 S 11/2010 Fader et al.
(Continued)

FOREIGN PATENT DOCUMENTS

EP 3259447 B1 1/2020

OTHER PUBLICATIONS

Jul. 19, 2023 Notice of Allowance for U.S. Appl. No. 18/098,516, 5 Pages.
(Continued)

*Primary Examiner* — Janine M Kreck
*Assistant Examiner* — Michael A Goodwin
(74) *Attorney, Agent, or Firm* — Christopher J. Owens

(57) ABSTRACT

Cutting tools (14) and cutting tool assemblies (10) include a friction ring (79). The friction ring (79) is provided in (disposed/secured within) a retaining groove (32) of a shank (30) of the cutting tool (14). The friction ring (79) can be formed from a resilient material or materials (150). The friction ring (79) can be secured in the retaining groove (32) by a retainer ring (80). The cutting tools (14) can also include a shank (30) having an increased diameter to provide increased strength and allow for a heavier cutting portion (28) of the cutting tool (14). The cutting tools (14) and cutting tool assemblies (10) can also include a washer (100) fitted about the shank (30) and positioned adjacent to a back side (26) of the cutting portion (28) of the cutting tool (14) for stabilizing the cutting tool body (22) in relation to a cutting tool holder (12).

29 Claims, 10 Drawing Sheets

(56) References Cited

U.S. PATENT DOCUMENTS

| | | | | |
|---|---|---|---|---|
| 8,500,209 | B2 * | 8/2013 | Hall | E21C 35/183 299/106 |
| D742,948 | S | 11/2015 | Kenno et al. | |
| D742,949 | S | 11/2015 | Kenno et al. | |
| 9,567,811 | B2 | 2/2017 | Kenno | |
| D818,507 | S | 5/2018 | Swope et al. | |
| D839,936 | S | 2/2019 | Weber et al. | |
| 10,260,341 | B2 | 4/2019 | Kammerer et al. | |
| 10,294,786 | B2 | 5/2019 | Weber et al. | |
| D868,122 | S | 11/2019 | Rose et al. | |
| 10,465,512 | B2 | 11/2019 | Kenno et al. | |
| D920,401 | S | 5/2021 | Congdon et al. | |
| D938,999 | S | 12/2021 | Congdon et al. | |
| D963,718 | S | 9/2022 | Congdon et al. | |
| 11,585,217 | B2 * | 2/2023 | Kenno | E21C 35/197 |
| 2003/0047985 | A1 * | 3/2003 | Stiffler | E21C 35/197 299/102 |
| 2004/0118615 | A1 * | 6/2004 | Beach | E21B 10/44 299/102 |
| 2008/0030065 | A1 * | 2/2008 | Frear | E21C 35/197 299/104 |
| 2009/0108664 | A1 | 4/2009 | Hall et al. | |
| 2012/0242136 | A1 | 9/2012 | Ojanen | |
| 2013/0169022 | A1 * | 7/2013 | Monyak | E21C 35/197 299/79.1 |
| 2013/0169023 | A1 * | 7/2013 | Monyak | E21C 35/197 299/104 |
| 2014/0339882 | A1 * | 11/2014 | Hall | B28D 1/188 299/79.1 |
| 2015/0252670 | A1 * | 9/2015 | Wachsmann | E21C 35/197 299/10 |
| 2016/0230551 | A1 | 8/2016 | Lehnert et al. | |
| 2017/0342831 | A1 | 11/2017 | Weber et al. | |
| 2018/0073359 | A1 * | 3/2018 | Kraemer | E21C 35/18 |
| 2018/0245467 | A1 | 8/2018 | Kenno et al. | |
| 2019/0106988 | A1 | 4/2019 | Buhr et al. | |

OTHER PUBLICATIONS

May 3, 2023 Non-Final Office Action U.S. Appl. No. 18/098,516, 13 Pages.

United States Defensive Publication No. UST10360214 Nov. 1, 1983.

Feb. 3, 2022 Non-Final OA—U.S. Appl. No. 17/198,747.

Oct. 26, 2022 Notice of Allowance U.S. Appl. No. 17/198,747, 7 pages.

Nov. 23, 2022 Notice of Allowance U.S. Appl. No. 29/773,760, 6 pages.

Oct. 17, 2023 Notice of Allowance for U.S. Appl. No. 18/098,516, 2 Pages.

* cited by examiner

CUTTING TOOL WITH SHANK PORTION CONFIGURED FOR LIMITING ROTATION AND CONTROLLING ORIENTATION OF THE TOOL

FIELD OF THE INVENTION

The present invention involves rotatable cutting tools, and more particularly relates to an enhanced shank portion of rotatable cutting tools and/or a friction ring component thereof.

BACKGROUND INFORMATION

Rotatable cutting tools may be used for the impingement of a substrate or earth strata such as, for example, asphaltic roadway material, coal deposits, mineral formations and the like. Cutting tools can experience extreme wear and failure in a number of ways due to the environment in which they operate requiring that they be frequently replaced.

In polycrystalline diamond (PCD) applications in particular, with the increased weight of the cutting portion (or cutting head) and resulting increased rotation of the tool, the shank (and/or associated components) of the cutting tool are subjected to more wear and loading. This becomes a limiting factor on the life of the cutting tool.

Thus, it would be helpful to be able to provide an improved cutting tool or cutting tool assembly that experiences less wear and mechanical failure and therefore an increase in useful tool life as compared to conventional cutting tools.

It would also be helpful to be able to provide an improved cutting tool or cutting tool assembly suitable for the PCD application and/or other applications where a cutting portion of relatively high mass is utilized.

SUMMARY OF THE INVENTION

Cutting tools and cutting tool assemblies are provided that include a “friction ring” (also referred to herein as a “braking ring” or a “rotation-limiting element”). The friction ring may be provided in (disposed/secured within) a retaining groove (e.g., provided in the form of a retaining groove) of a shank of the cutting tool. The friction ring may be formed from a resilient and non-rigid material. The friction ring may be secured in the retaining groove of a shank by a retainer ring. The cutting tools may also include a shank having an increased diameter to provide increased strength and allow for a heavier cutting portion (or cutting head) of the cutting tool. The cutting tools and cutting tool assemblies may also include a washer fitted about the shank and positioned adjacent to a back side (or rearward/proximal facing portion) of the cutting portion of the cutting tool.

The friction ring can be configured such that additional portions of the friction ring reposition to be at an outer periphery of the friction ring as the retainer ring is disposed to increase compression of the friction ring. In example embodiments, a friction ring is provided in the form of axially interconnected (e.g., integrally formed) structures (e.g., toroidal or donut shaped) each of which is circumferentially disposed about the shank (within the retaining groove). In other example embodiments, the friction ring is provided in the form of circumferentially interconnected (e.g., integrally formed) axial structures (e.g., generally X-shaped, D-shaped or radial protrusions, as shown herein) which, when the friction ring is disposed/secured within a retaining groove of a tool shank, are sequentially axially disposed about the shank within the retaining groove.

An aspect of the invention is to provide a cutting tool comprising: a cutting tool body that is generally symmetrically formed about a central longitudinal axis of the cutting tool, the cutting tool body including a cutting head at a distal end portion of the cutting tool, the cutting head including a cutting member, and a shank axially rearward of and connected to the cutting head, the shank including a retaining groove provided therein; and a friction ring disposed within the retaining groove.

Another aspect of the invention is to provide a cutting tool assembly comprising: a cutting tool holder having a central longitudinal axis; and a cutting tool at least partially disposed within a substantially cylindrical chamber of the cutting tool holder, the cutting tool including a cutting tool body including a cutting head at a distal end portion of the cutting tool, the cutting head including a cutting member, and a shank axially rearward of and connected to the cutting head, the shank including a retaining groove provided therein at a proximal portion of the shank, a friction ring positioned within the retaining groove, and a retainer ring secured about the friction ring.

A further aspect of the invention is to provide a braking apparatus for a cutting tool assembly with a rotatable cutting tool and a cutting tool holder, the braking apparatus comprising: a resilient rotation limiting structure configured to be fitted within a retaining groove of the rotatable cutting tool and compressibly secured therein by a retaining structure disposed at an outer periphery of the resilient rotation limiting structure such that the resilient rotation limiting structure is outwardly radially self-biased causing the retaining structure to bear against an inside wall of the cutting tool holder imparting frictional resistance to rotational movement of the rotatable cutting tool within the holder.

DETAILED DESCRIPTION

Referring now to FIGS. 1-5, an example embodiment of a cutting tool assembly 10 is shown. In one aspect, the cutting tool assembly 10 illustrated herein pertains generally to road planning tools. However, it should be appreciated that the technologies described herein, namely cutting tool assemblies, cutting tools and components thereof, are or are potentially applicable to other types of cutting tools useful in other types of cutting operations, such as for example: road planning (or milling), coal mining, concrete cutting, and other kinds of cutting operations wherein a cutting tool with a hard cutting member impinges against a substrate (e.g., earth strata, pavement, asphaltic highway material, concrete, and the like) breaking the substrate into pieces of a variety of sizes including larger-size pieces or chunks and smaller-sized pieces including dust-like particles.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", is not to be limited to the precise value specified. In at least some instances, the approximating language may correspond to the precision of an instrument for measuring the value. Herein and throughout the specification and claims, range limitations may be combined and/or interchanged, such ranges are identified and include all the sub-ranges contained therein unless context or language indicates otherwise.

Figure 4:
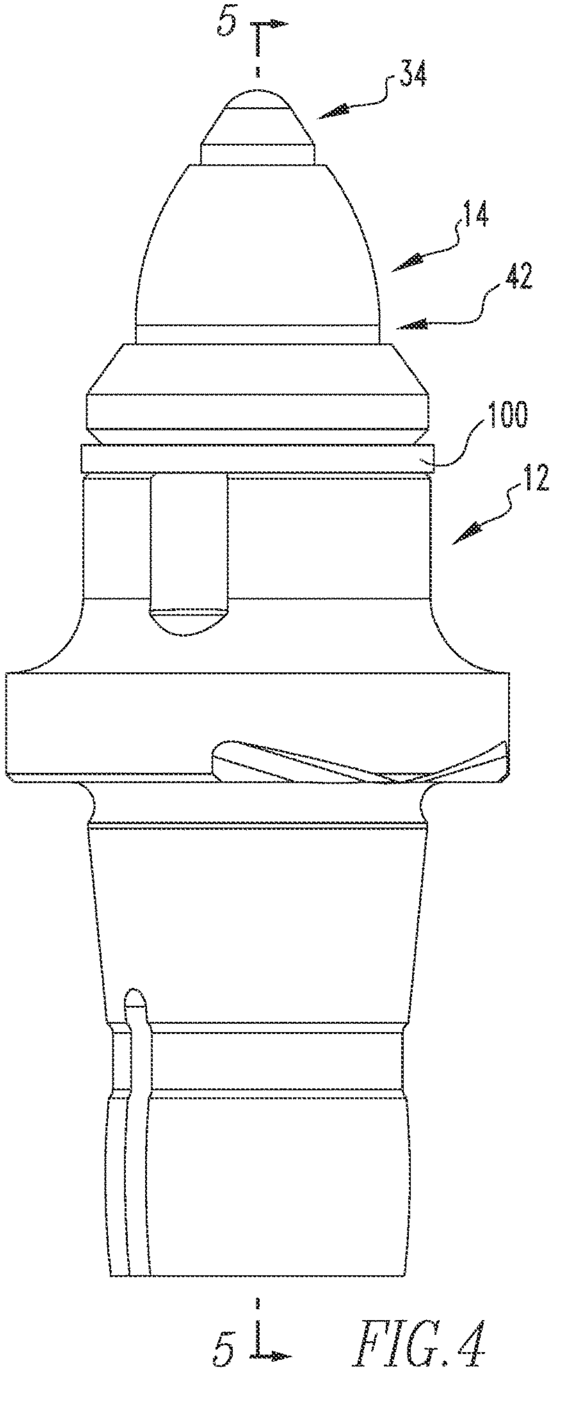
FIG. 4 is a side view of a cutting tool assembly showing the cutting tool of FIG. 1 fitted within a cutting tool holder of the assembly and the washer positioned between a distal (or axial forward) end of the holder and a back (or axial rearward) end of the base portion of the tool.
Figure 5:
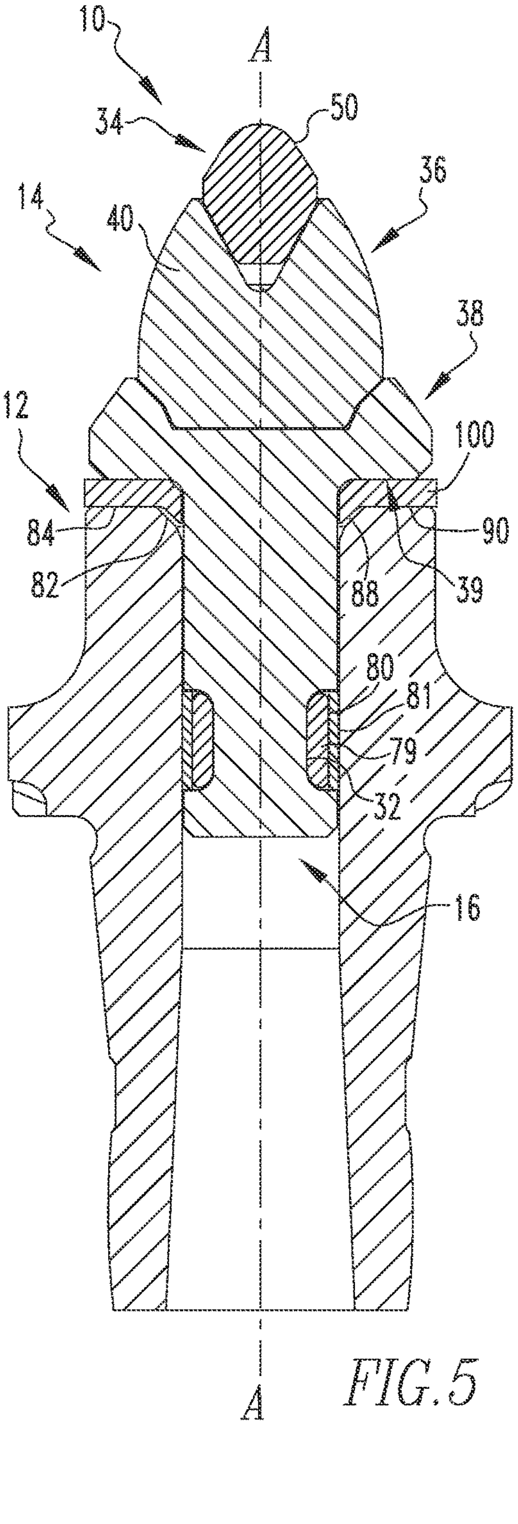
FIG. 5 is a side-sectional view taken through line 5-5 of FIG. 4.
Figure 6:
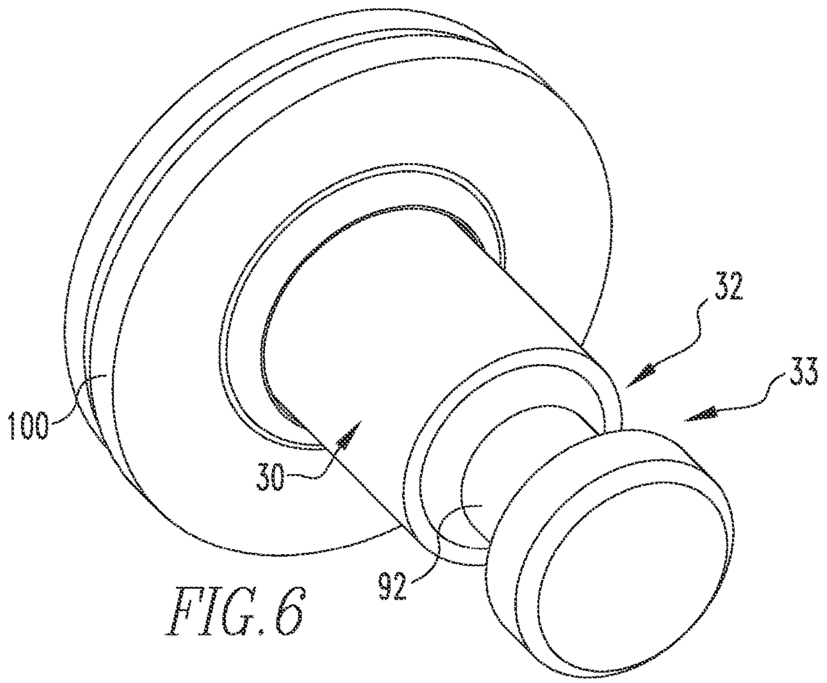
FIG. 6 is another isometric perspective view of the cutting tool (assembly) of FIG. 1, showing the proximal portion (only) of the cutting tool and the retaining groove of the shank without the friction ring and the retainer ring.
Figure 7:
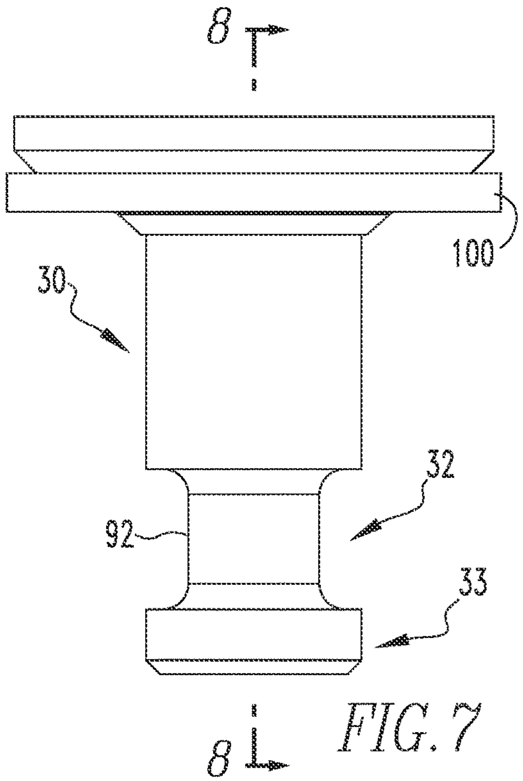
FIG. 7 is a side view of the cutting tool (assembly) of FIG. 6.
Figure 8:
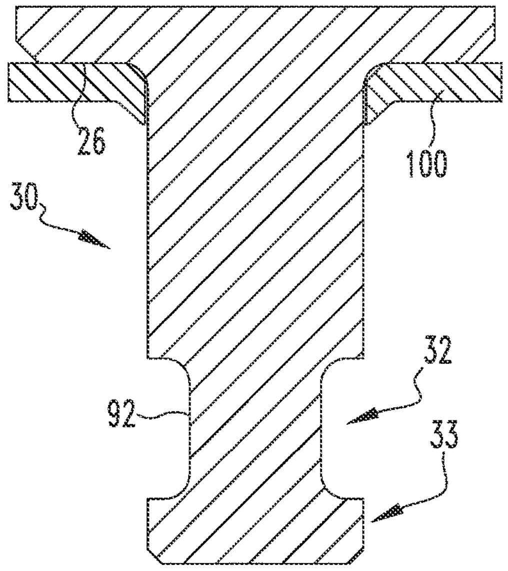
FIG. 8 is a side-sectional view taken through line 8-8 of FIG. 7.
Figure 9:
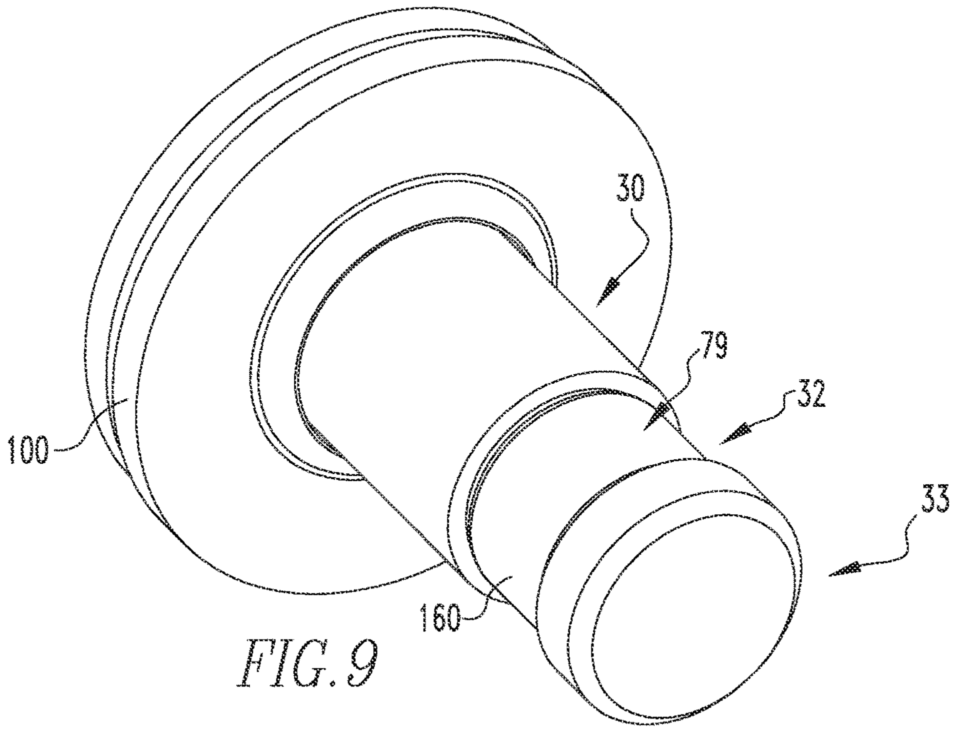
FIG. 9 is the isometric perspective view of the cutting tool (assembly) of FIG. 6, showing the retaining groove of the shank with the friction ring disposed therein.
Figure 10:
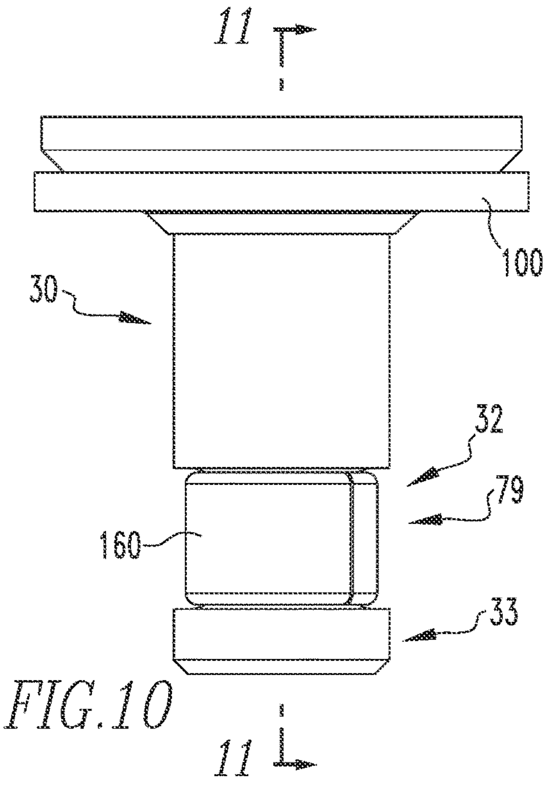
FIG. 10 is a side view of the cutting tool (assembly) of FIG. 9.

With reference to FIGS. 4 and 5, in this example embodiment, the cutting tool assembly 10 includes two main components: a cutting tool holder 12, having a central longitudinal axis, A-A, and a (rotatable) cutting tool 14. The cutting tool holder 12 is provided in the form of a sleeve member in which a portion of the rotatable cutting tool 14 is inserted within a substantially cylindrical chamber (or bore) 16 of the cutting tool holder 12. The rotatable cutting tool 14 is held in the cutting tool holder 12, for example, by a friction fit between an inside wall or surface of the holder and a retainer ring that is radially inwardly compressed about a portion of the cutting tool. The cutting tool 14 can be carried by the cutting tool holder 12 by inserting the cutting tool holder 12 into a block of a metal drum (not shown).

Figure 1:
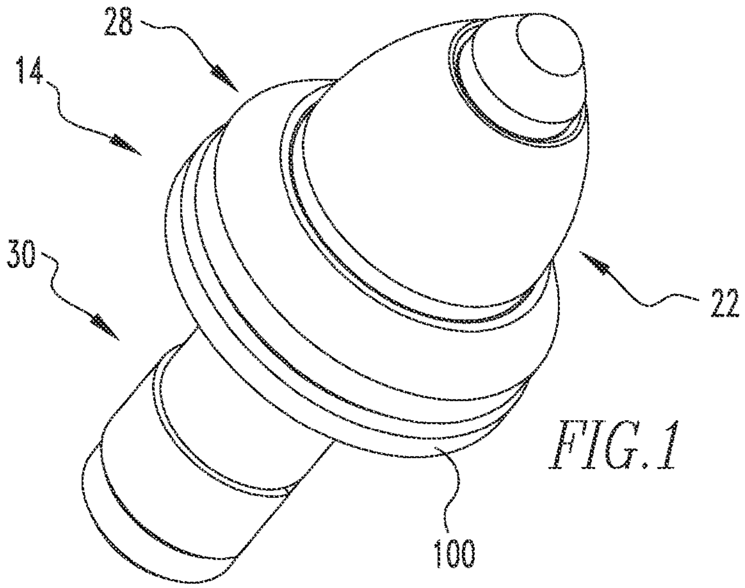
FIG. 1 is an isometric perspective view of an example embodiment of a cutting tool (assembly) shown with a washer fitted about a shank or shank portion of the tool and positioned against or adjacent to a base portion of the tool and with a retainer ring secured about and within a retaining groove at a proximal portion of the shank.
Figure 2:
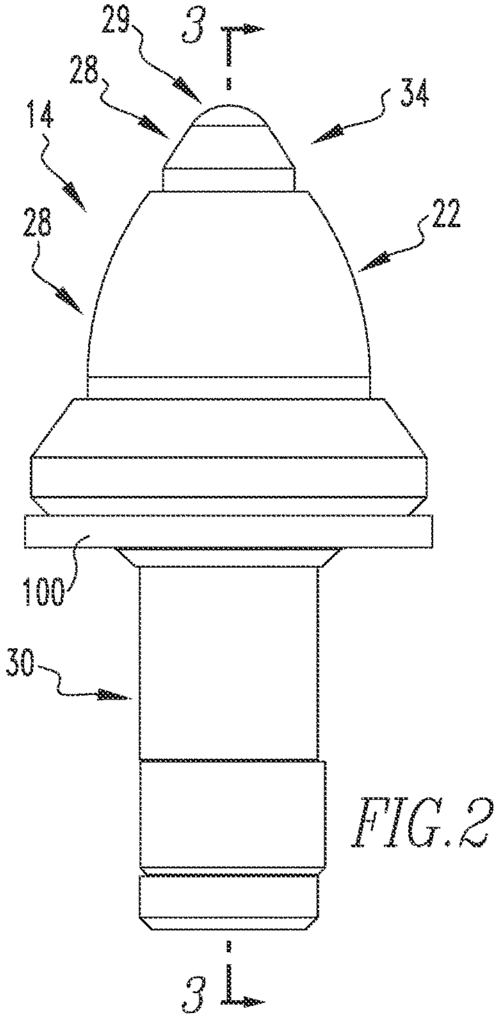
FIG. 2 is a side view of the cutting tool (assembly) of FIG. 1.
Figure 3:
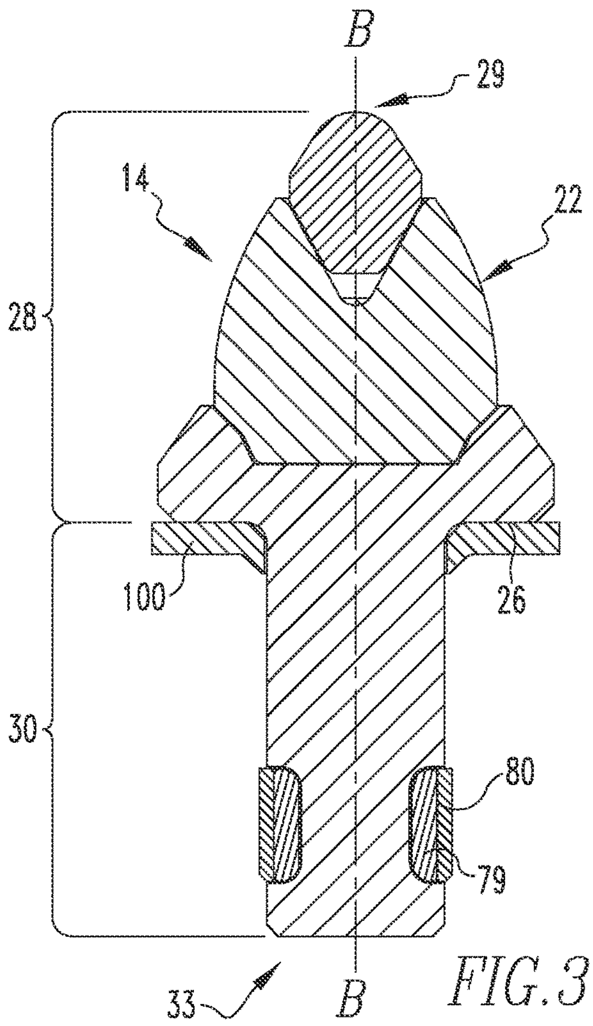
FIG. 3 is a side-sectional view taken through line 3-3 of FIG. 2, showing the retaining groove formed or provided in the shank, a friction ring (or braking ring) disposed within the retaining groove, and a retainer ring disposed over (compressed about) the friction ring and secured within the retaining groove.

Referring now to FIGS. 1-3, the cutting tool 14 has a cutting tool body 22 which includes a cutting head or head portion 28 and a shank or shank portion 30 axially rearward of the cutting head 28. The rotatable cutting tool 14 has a central longitudinal axis B-B (FIG. 3). In this example embodiment, the cutting tool body 22 is elongate, extending axially (i.e., along the axis B-B) from a proximal portion 33 (of the shank 30) to an axial rearward end 26 (of the cutting head 28) and further to a distal end portion or axial forward end 29 (of the cutting head 28), and has a generally cylindrical geometry (e.g., as shown). The rotatable cutting tool 14, when held within and supported by the holder 12, is rotatable about the axis B-B. In example embodiments, the cutting tool body 22 is symmetrical about the axis B-B (e.g., has an external shape and/or distribution of mass that is symmetrical about the axis B-B). When the rotatable cutting tool 14 is properly mounted in the cutting tool holder 12, the axis B-B of the rotatable cutting tool 14 is substantially aligned with the central longitudinal axis A-A of the cutting tool holder 12.

With reference to FIGS. 4 and 5, in this example embodiment, the cutting head 28 includes a cutting member 34 at the distal end portion or axial forward end 29 of the head 28, a bolster portion 36 axially rearward of the cutting member 34, and a base portion 38 at an axial rearward end 39 of the head 28. The bolster portion 36 includes, e.g., configured/shaped as shown, a convex shape section 40 and a generally cylindrical section 42 contiguous with and axially rearward of the convex shape section 40. In example embodiments, the bolster portion 36 of the head 28 includes, at least in part, a cemented (cobalt) tungsten carbide material.

The convex shape section 40 of the bolster portion 36 can have a radius, for example, in the range of about 30 mm to about 35 mm. Advantageously, this configuration of having the radius, R, provides the necessary structure and support for the cutting member 34. In addition, this configuration advantageously provides, for example, the ability to add mass or size to the bolster portion 36 for improved wear while still maintaining a streamlined design for efficient cutting. In example embodiments, the bolster portion 36 is formed, at least in part, of a cemented (cobalt) tungsten carbide material that allows for the bolster portion 36 to retain its shape and integrity for a longer period of time during use.

The cutting member 34 can include a super hard material 50, e.g., provided in the form of an outer layer of the cutting member 34. The super hard material 50 can be made of, for example, polycrystalline diamond (PCD) or polycrystalline cubic boron nitride (PcBN).

With reference to FIG. 5, an alignment feature of the cutting tool assembly 10 is provided by a washer 100 (including a central cylindrical opening) fitted about the shank 30 and positioned against or adjacent to the base portion 38 of the tool 14. The washer 100 and the cutting tool holder 12 are configured (e.g., with complementary surfaces) for establishing and maintaining alignment of the cutting tool body 22 with the cutting tool holder 12. In this example embodiment, the cutting tool holder 12 includes a chamfered surface 82 and a radial support surface 84, and the washer 100 includes a chamfered surface 88 and a radial support surface 90 (e.g., configured/shaped as shown with the chamfered surfaces 82 and 88 being generally complementary to each other, and the radial support surfaces 84 and 90 being generally complementary to each other). In an example embodiment, one or more of the chamfered surfaces 82 and 88 form an angle of about 45 degrees (or an angle in a range between about 30 and 60 degrees) with the central longitudinal axis A-A of the holder 12.

In regard to reducing/stopping the rotation of the cutting tool 14 (e.g., in relation to the holder 12), in example embodiments, the cutting tool 14 includes a friction ring 79, positioned (and secured) within a retaining groove 32 of the shank 30, and a retainer ring 80 (e.g., a wedding band style retainer ring) secured about the friction ring 79 (and, in example embodiments/implementations, partially within the retaining groove 32). The retainer ring 80 is shaped and configured to secure the friction ring 79 in the retaining groove 32, which by way of example can be provided in the form of an annular groove 92 such as described and/or depicted herein, or in other forms suitable for receiving a friction ring therein.

In this example embodiment, the retaining groove 32 is provided at a proximal portion 33 of the shank 30 (e.g., as shown). By way of example, the retaining groove 32 has a width (measured axially along the central longitudinal axis A-A) of around 13 mm and a depth of around 4.1 mm, in relation to the (cylindrical surface of the) shank 30, which has a diameter of around 20 mm. The aforementioned shank diameter of around 20 mm is approximately 3 mm larger than in conventional cutting tools and serves, in example embodiments, to accommodate tools having heavier cutting heads by increasing the diameter (and therefore also the mass) of the shank 30 which increases shank strength and durability and, for designs including a cutting head of increased mass, provides a counterbalance (in mass) that serves to migrate proximally (along the central longitudinal axis A-A) a center of mass of the cutting tool body 22.

In example embodiments, the shank 30, the friction ring 79, the retainer ring 80 and the cutting tool holder 12 are (respectively sized and/or shaped and) configured such that the cutting tool body 22 is (supported by and) rotatable within the cutting tool holder 12 (i.e., about the central longitudinal axis (A-A)) with the retainer ring 80 bearing against an inside wall 81 of the cutting tool holder 12 (imparting frictional resistance to rotational movement of the cutting tool body in relation to the holder slowing the rotational speed of the tool—e.g., slowing tool rotation speed by 25-50% which could increase the useful tool life by potentially 25-50%). The resistance to rotation (or frictional resistance) can be, for example, from 1 in-lb to fixed, greater than 1 in-lb, greater than 0.5 ft-lb, greater than 1 ft-lb, from 1 to 100 ft-lb or from 1 to 150 ft-lb of torque on the tools. Install and remove force of the tools can be between 100 and 1000 lbs. The thickness of the friction ring 79 (e.g., formed from urethane) can be, for example, between 0.080 inches and 0.5 inches; and the diameter of the retainer ring 80 (e.g., metal retainers) can be, for example, between 0.5 inches and 1.75 inches.

In example embodiments, the shank 30, the friction ring 79, the retainer ring 80 and the cutting tool holder 12 are (respectively sized and/or shaped and) configured such that the retainer ring 80 is fixed or secured in position in relation to the inside wall 81 of the cutting tool holder 12 and compressed sufficiently tightly about the friction ring 79 to prevent the cutting tool body 22 from rotating within the holder 12 (e.g., providing an indexable cutting tool).

Figure 11:
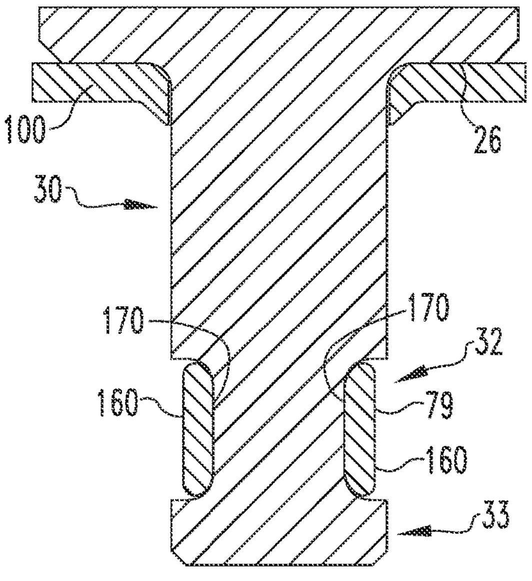
FIG. 11 is a side-sectional view taken through line 11-11 of FIG. 10.
Figure 12:
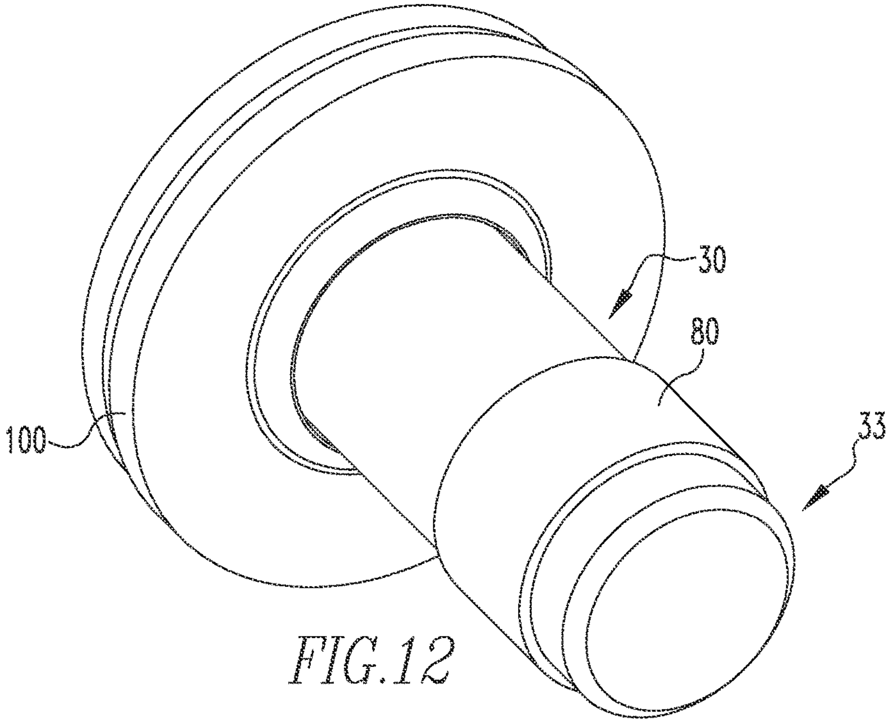
FIG. 12 is the isometric perspective view of the cutting tool (assembly) of FIG. 6, showing the retaining groove of the shank with the friction ring disposed therein and the retainer ring disposed over (compressed about) the friction ring and secured within the retaining groove.
Figure 13:
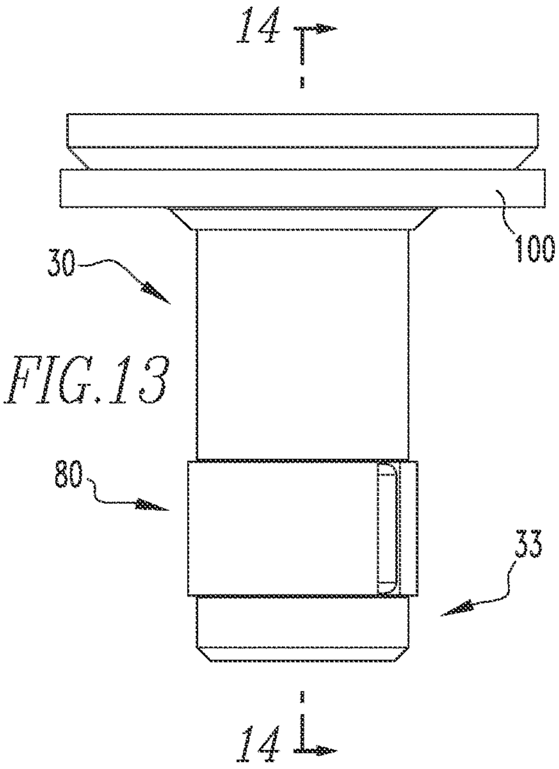
FIG. 13 is a side view of the cutting tool (assembly) of FIG. 12.
Figure 14:
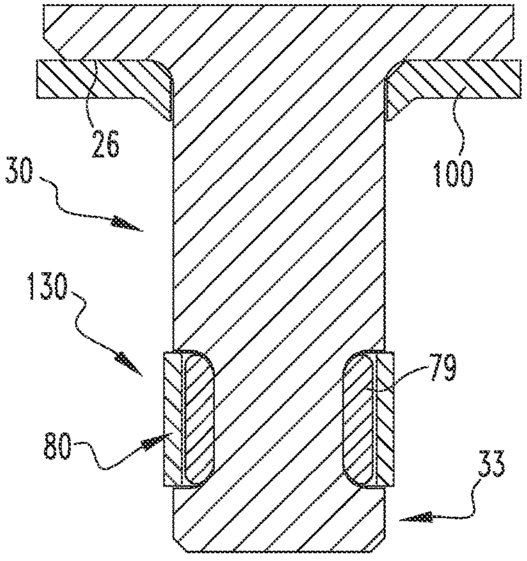
FIG. 14 is a side-sectional view taken through line 14-14 of FIG. 13.

In example embodiments, the shank 30, the friction ring 79, the retainer ring 80 and the cutting tool holder 12 are (respectively sized and/or shaped and) configured such that an outer periphery (i.e., radially outward periphery) 160 (FIG. 11) of the friction ring 79 is compressed radially inwardly when the shank 30 is in the holder 12—this radially inward compression being substantially uniform in magnitude (at different locations) along the radially outward periphery 160.

The term "friction ring" as used herein can be construed to mean a component, apparatus or device, whether a single element or an assembly: configured to selectively interface and frictionally engage with a cutting tool body and a cutting tool holder to reduce or stop rotation of the cutting tool (e.g., in relation to the holder); which is resilient, generally ring-shaped, configured to be fitted within a retaining groove (e.g., an annular groove) of a shank portion of the cutting tool body and radially inwardly compressed and secured within the retaining groove and that may be positioned radially inside/concentrically within an outer retainer ring; which includes surfaces that may make frictional contact with adjacent elements (i.e., a radial inner surface of the friction ring that may frictionally engage an outer radial surface of the retaining/annular groove and/or side edges of the friction ring that may frictionally engage sidewalls of the retaining/annular groove; and a radial outer surface of the friction ring that produces frictional contact with the radial inner surface of the cylindrical inside wall of the holder (either through direct contact therebetween or by pressing against a retainer ring located radially outside and at least partially surrounding the friction ring); which may have continuous and/or discontinuous friction contact surfaces/features, e.g., projections and recesses spaced circumferentially around the inner and/or outer surfaces of the friction ring and/or spaced along the longitudinal axis of the friction ring; and for embodiments including a retainer ring, the friction ring having outer radial surface(s) that may frictionally engage an inner radial surface of the retainer ring, and being configured in conjunction with the retainer ring and/or the holder such that an outer radial surface of the retainer ring may, in turn, frictionally engage the radial inner surface of the cylindrical inside wall of the holder. The friction ring 79 can be a unitary (solid) element or structure (e.g., provided in the form generally of a C-shaped split ring) and, in example embodiments, is made of a resilient (and/or structurally reconfigurable) material or materials 150 including, for example, nylon, neoprene, polyurethane, rubber, epoxy resin, foam, or a combination thereof.

Figure 15:
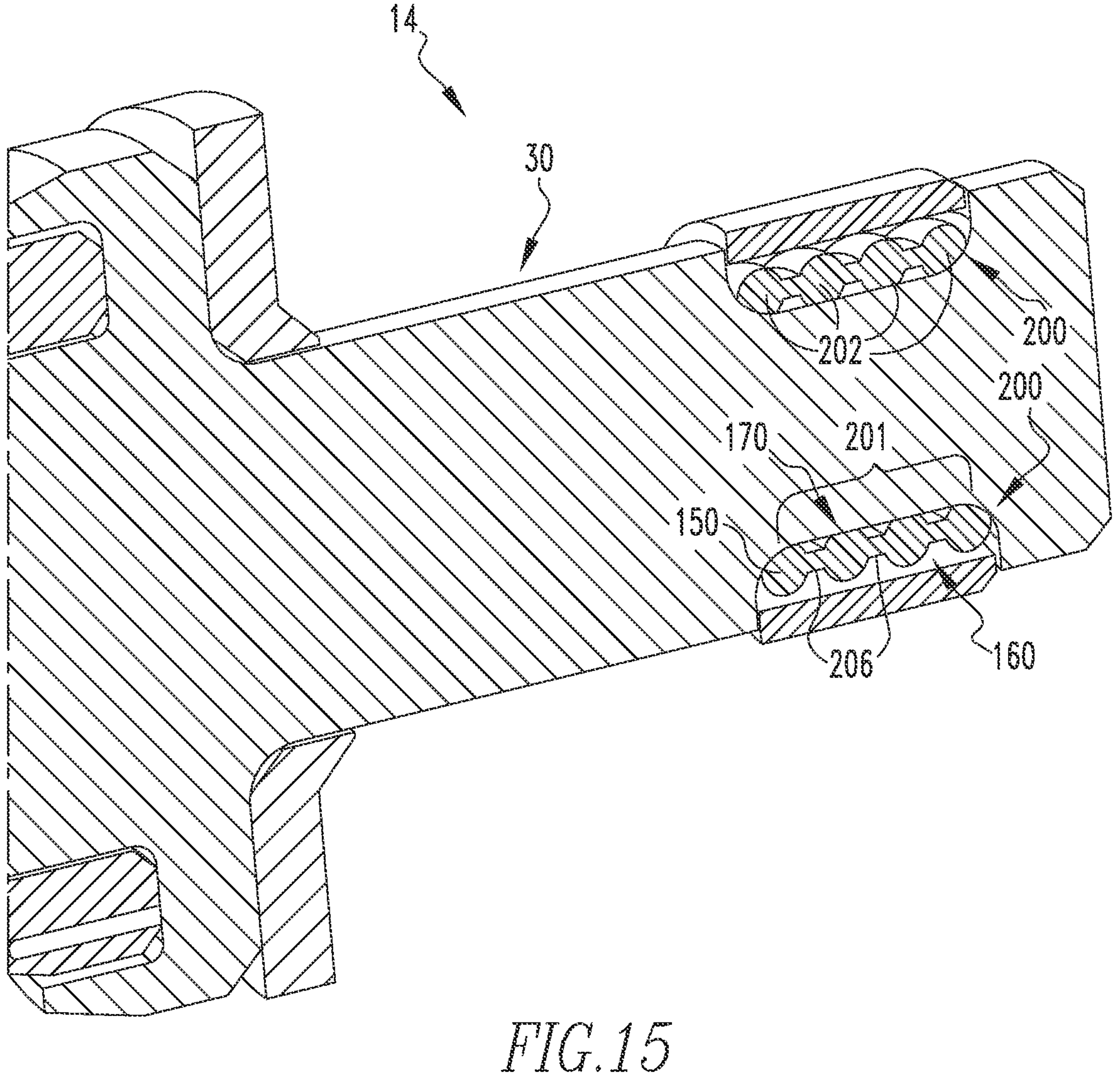
FIG. 15 is an isometric perspective cross-sectional view of an example cutting tool including a friction ring (or braking ring), e.g., made of urethane, with a retainer ring (shown uncompressed) thereabout, the friction ring being provided in the form of axially interconnected (e.g., integrally formed) structures (e.g., toroidal or donut shaped, as shown) each of which is circumferentially disposed about the shank (within the retaining groove).

Friction rings can be provided in other forms as well. By way of example and referring to FIG. 15, in example embodiments, a friction ring (or braking ring) 200 includes axially interconnected (e.g., integrally formed) structures 202 each of which is circumferentially disposed about the shank 30 within the retaining groove 32. In this example embodiment, the axially interconnected structures are toroidal, or donut shaped, with the axially interconnected structures 202 and their axial interconnections 206 together providing a generally ring-shaped structure 201 (e.g., as shown).

Figure 16B:
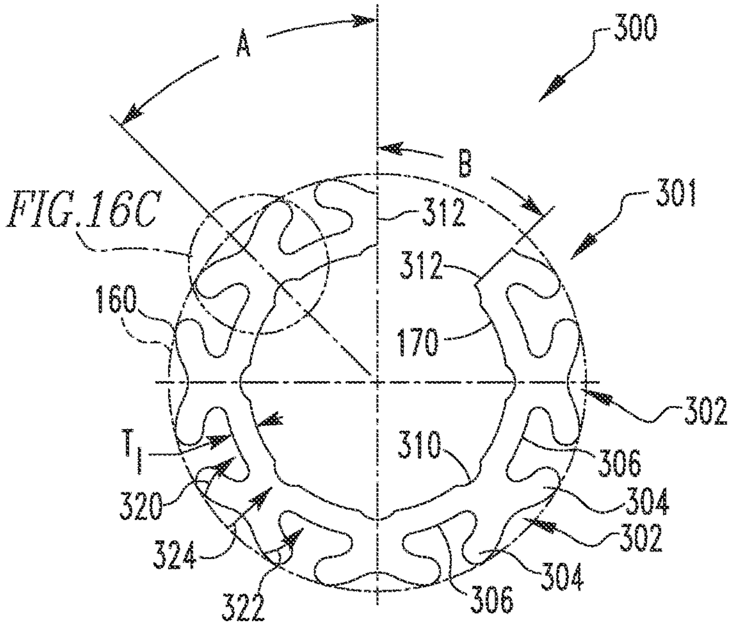
FIG. 16B is an axial end view of the friction ring of FIG. 16.
Figure 16A:
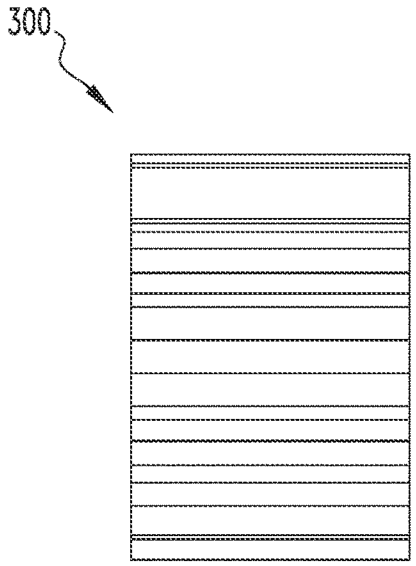
FIG. 16A is a lateral side view of the friction ring of FIG. 16.
Figure 16C:
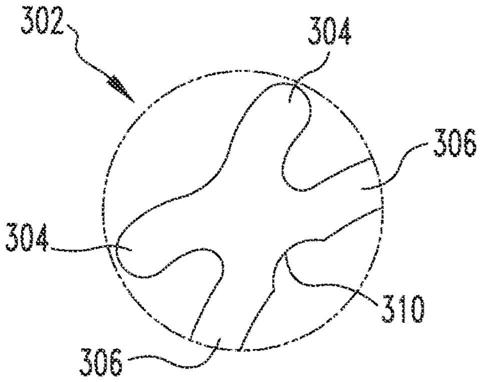
FIG. 16C shows DETAIL B of FIG. 16B.
Figure 16:
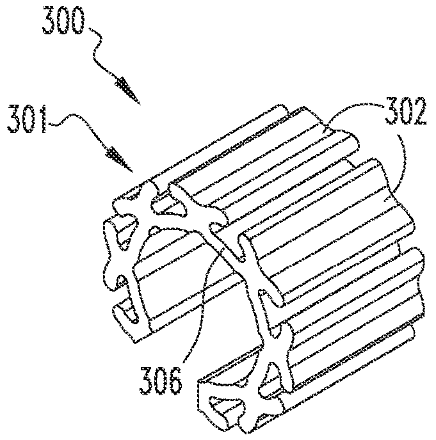
FIG. 16 is an isometric perspective view of an example friction ring (or braking ring) provided in the form of circumferentially interconnected (e.g., integrally formed) axial structures (e.g., generally X-shaped inclusive of radially outwardly biased spring portions, as shown), e.g., made of urethane which, when the friction ring is disposed/secured within a retaining groove of a tool shank, are sequentially axially disposed about the shank (within the retaining groove).
Figure 16D:
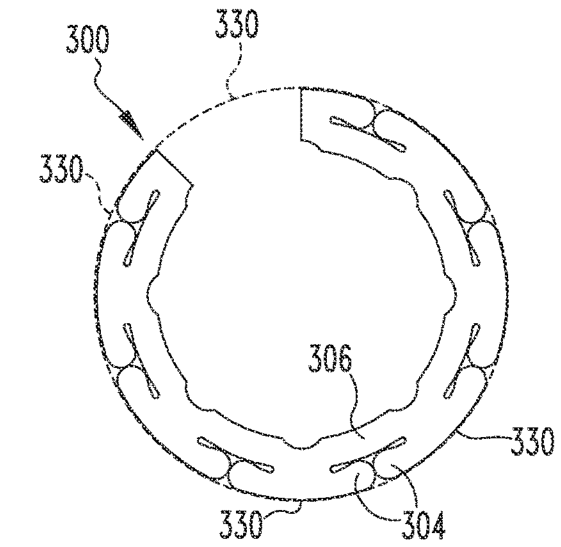
FIG. 16D is an axial end view of the friction ring of FIG. 16 shown in a compressed configuration.
Figure 16E:
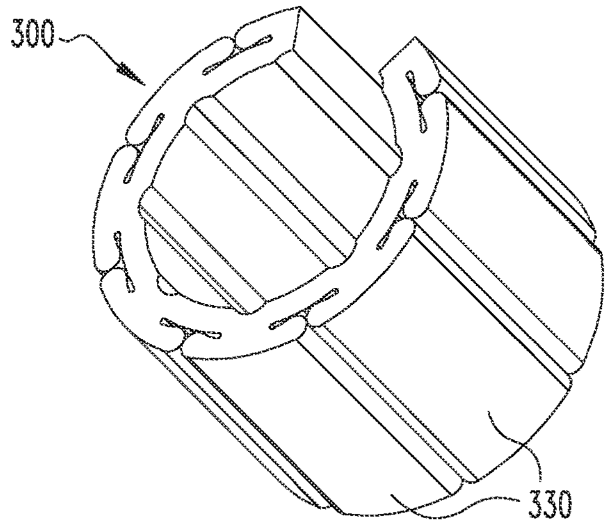
FIG. 16E is an isometric perspective view of the friction ring shown in FIG. 16D in a compressed configuration.

In other example embodiments, friction rings are provided in the form of circumferentially interconnected (e.g., integrally formed) axial structures which are sequentially axially disposed about the shank 30 within the retaining groove 32. Referring to FIGS. 16, 16A, 16B and 16C, in example embodiments, a friction ring (or braking ring) 300 includes circumferentially interconnected (e.g., integrally formed) axial structures 302 which are sequentially axially disposed moving circumferentially along an outer periphery 160 of the friction ring 300. In this example embodiment, the circumferentially interconnected axial structures 302 are generally X-shaped inclusive of radially outwardly biased spring portions 304, with the circumferentially interconnected axial structures 302 and their circumferential interconnections 306 together providing a generally ring-shaped structure 301 (e.g., as shown). In this example embodiment, there are six (6) sequentially interconnected (complete X-shaped) axial structures 302 circumferentially disposed along the outer periphery 160 (of the friction ring 300) and two (2) half X-shaped axial structures defining opposite ends 312 of the generally ring-shaped structure 301. At an inner periphery 170 of the friction ring 300, each of the axial structures 302 includes a centrally located arcuate recess 310 (e.g., provided as shown) which is configured to further facilitate overall radial compression of the friction ring 300 as the arcuate recesses 310 flatten (slightly), responsive to compression applied by the retainer ring 80. By way of example, the angular distance (denoted “A”) between the centers (at recess 310) of adjacent axial structures is typically 45 degrees; and the angular distance (denoted “B”) between the opposite ends 312 is around 45 degrees. Further in this regard, at the outer periphery 160, the radially outwardly biased spring portions 304 reposition inwardly (responsive to the aforementioned compression, as denoted by the arrows 320 and 322) repositioning the outer periphery 160 inwardly as denoted by the arrow 324, with an increase in the areas of contact between exterior surfaces of the generally X-shaped axial structures 302 and the interior of the retainer ring 80 resulting—see FIGS. 16D and 16E which show the friction ring 300 in a compressed configuration. In this example embodiment, each of the axial structures 302 encompasses (and the angular distance between the ends 312, when the friction ring 300 is uncompressed, is) around 45 degrees of the periphery 160, and the circumferential interconnections 306 each have a (radial) thickness, TI, of around 1.1 mm. In the compressed configuration shown in FIGS. 16D and 16E, the radially outwardly biased spring portions 304 are radially inwardly repositioned to locate adjacent to the circumferential interconnections 306 with the radially outward facing surfaces of the portions 304 providing a contact surface/friction interface 330 between the friction ring 300 and the interior of the retainer ring 80 (or, in embodiments without a retainer ring, the inside wall 81 of the holder 12). In this example embodiment, the contact surface/friction interface 330 is mostly (or substantially) continuous at the radially outward periphery of the friction ring 300 in the illustrated compressed configuration.

Figure 17B:
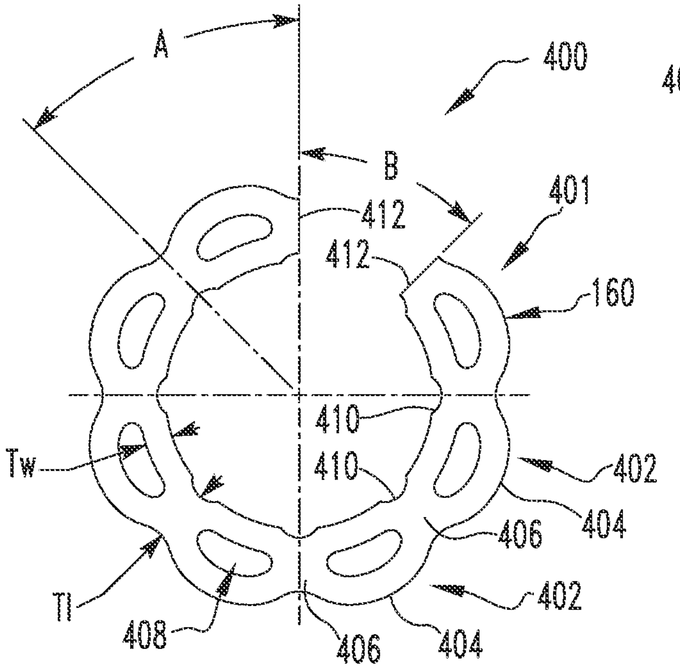
FIG. 17B is an axial end view of the friction ring of FIG. 17.
Figure 17A:
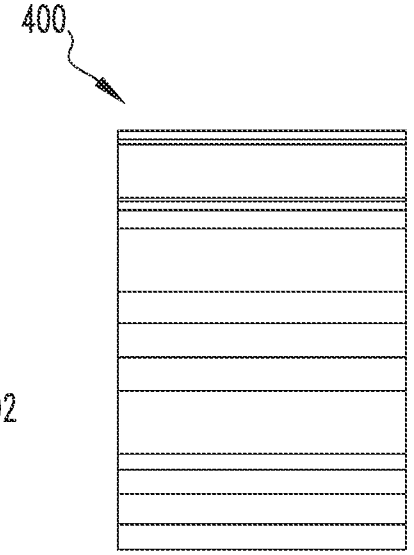
FIG. 17A is a lateral side view of the friction ring of FIG. 17.
Figure 17:
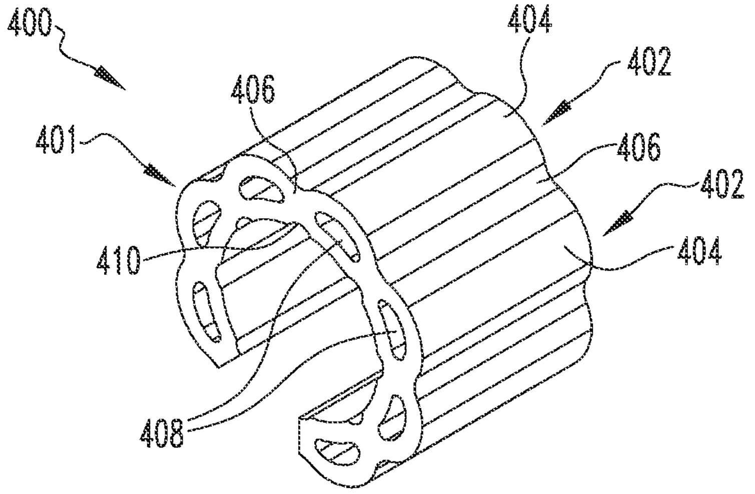
FIG. 17 is an isometric perspective view of an example friction ring (or braking ring) provided in the form of circumferentially interconnected (e.g., integrally formed) axial structures (e.g., generally D-shaped inclusive of radially outwardly biased spring portions and with axially extending channels or hollow portions, as shown) which, when the friction ring is disposed/secured within a retaining groove of a tool shank, are sequentially axially disposed about the shank (within the retaining groove).

Referring to FIGS. 17, 17A and 17B, in example embodiments, a friction ring (or braking ring) 400 includes circumferentially interconnected (e.g., integrally formed) axial structures 402 which are sequentially axially disposed moving circumferentially along an outer periphery 160 of the friction ring 400. In this example embodiment, the circumferentially interconnected axial structures 402 are generally D-shaped inclusive of radially outwardly biased spring portions 404 and axially extending channels (or hollow portions) 408 defined by each of the structures 402 respectively, with the circumferentially interconnected axial structures 402 and their circumferential interconnections 406 together providing a generally ring-shaped structure 401 (e.g., as shown). In this example embodiment, there are seven (7) sequentially interconnected (complete D-shaped) axial structures 402 circumferentially disposed along the outer periphery 160 (of the friction ring 400) between the opposite ends 412 of the generally ring-shaped structure 401. At an inner periphery 170 of the friction ring 400, each of the circumferential interconnections 406 includes a centrally located arcuate recess 410 (e.g., provided as shown) which is configured to further facilitate overall radial compression of the friction ring 400 as the arcuate recesses 410 flatten responsive to compression applied by the retainer ring 80. By way of example, the angular distance (denoted “A”) between the centers (at recess 410) of adjacent axial structures is typically 45 degrees; and the angular distance (denoted “B”) between the opposite ends 412 is around 45 degrees. Further in this regard, at the outer periphery 160, the radially outwardly biased spring portions 304 reposition inwardly (responsive to the aforementioned compression) repositioning the outer periphery 160 inwardly, with an increase in the areas of contact between exterior surfaces of the generally D-shaped axial structures 402 and the interior of the retainer ring 80 resulting. In this example embodiment, each of the axial structures 402 encompasses (and the angular distance between the ends 412, when the friction ring 400 is uncompressed, is) around 45 degrees of the periphery 160, the circumferential interconnections 406 each have a (radial) thickness, TI, of around 2.4 mm, and the walls defining the channels (or hollow portions) 408 have a thickness, TW, of around 1.2 mm.

Figure 18C:
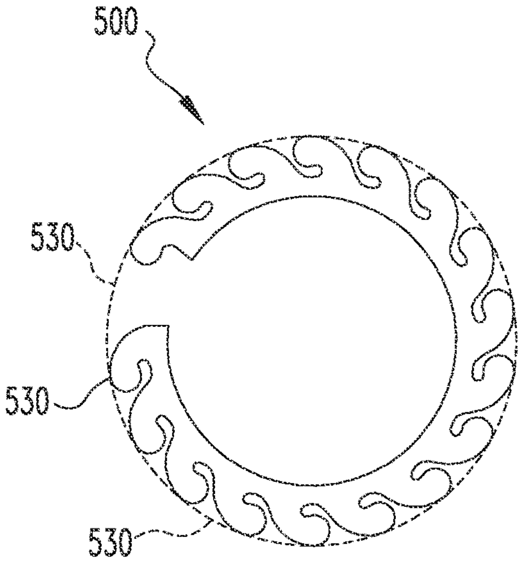
FIG. 18C is an axial end view of the friction ring of FIG. 18 shown in a compressed configuration.
Figure 18D:
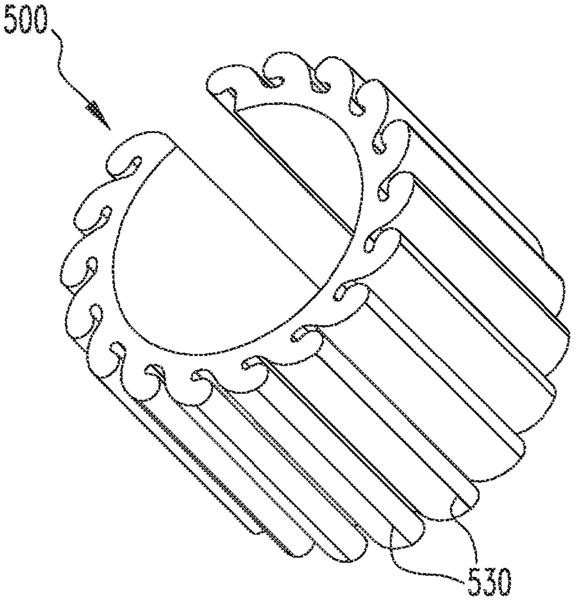
FIG. 18D is an isometric perspective view of the friction ring shown in FIG. 18C in a compressed configuration.
Figure 18B:
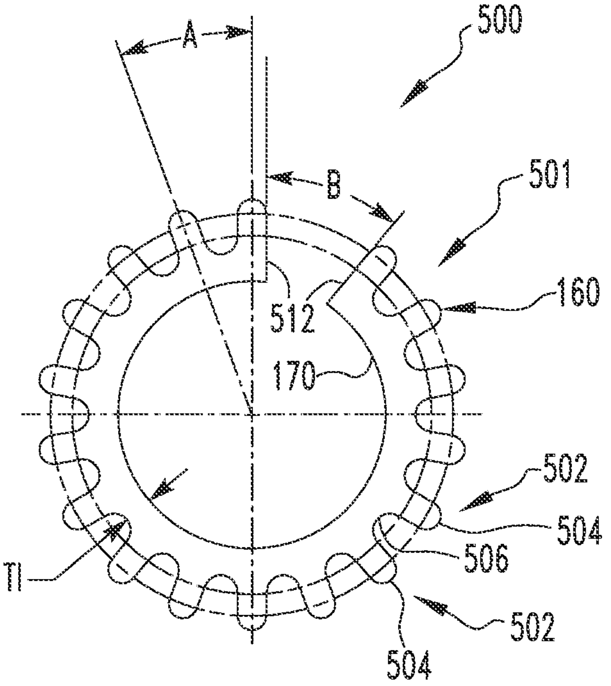
FIG. 18B is an axial end view of the friction ring of FIG. 18.
Figure 18A:
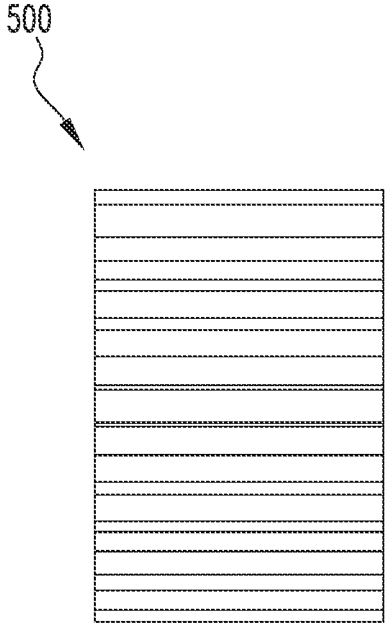
FIG. 18A is a lateral side view of the friction ring of FIG. 18.
Figure 18:
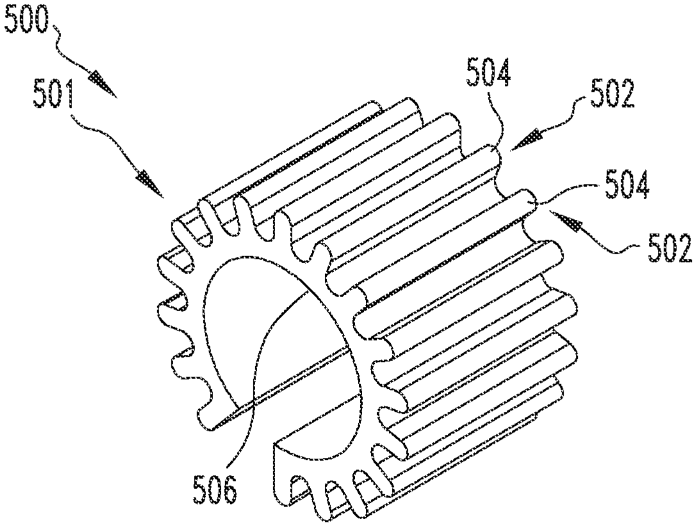
FIG. 18 is an isometric perspective view of an example friction ring (or braking ring) provided in the form of circumferentially interconnected (e.g., integrally formed) axial structures (e.g., radial protrusions, i.e., radially outwardly biased spring portions, each axially extending/extruded as shown) which, when the friction ring is disposed/secured within a retaining groove of a tool shank, are sequentially axially disposed about the shank (within the retaining groove).

Referring to FIGS. 18, 18A and 18B, in example embodiments, a friction ring (or braking ring) 500 includes circumferentially interconnected (e.g., integrally formed) axial structures 502 which are sequentially axially disposed moving circumferentially along an outer periphery 160 of the friction ring 500. In this example embodiment, the circumferentially interconnected axial structures 502 are radial protrusions 504 (and/or other structures) that are biased to maintain/return to a radially outwardly directed (and/or uncompressed) shape and/or sequentially equidistantly positioned along the outer periphery 160, with the circumferentially interconnected axial structures 502 and their circumferential interconnections 506 together providing a generally ring-shaped structure 501 (e.g., as shown)—see FIGS. 18C and 18D which show the friction ring 500 in a compressed configuration. In this example embodiment, there are seventeen (17) sequentially interconnected (complete protrusion) axial structures 502 circumferentially disposed along the outer periphery 160 (of the friction ring 500) between the opposite ends 512 of the generally ring-shaped structure 501. By way of example, the angular distance (denoted "A") between the centers of adjacent axial structures 502 is typically 20 degrees; and the angular distance (denoted "B") between the opposite ends 512 is around 40 degrees. In this example embodiment, the circumferential interconnections 506 each have a (radial) thickness, TI, of around 1.4 mm and the width of each protrusion 504 is around 1.4 mm. In the compressed configuration shown in FIGS. 18C and 18D, the radial protrusions 504 are repositioned sideways, e.g., all in the same angular rotational direction as shown, to locate adjacent to the circumferential interconnections 506 with the sides of the radial protrusions 504 now providing a contact surface/friction interface 530 between the friction ring 500 and the interior of the retainer ring 80 (or, in embodiments without a retainer ring, the inside wall 81 of the holder 12). In this example embodiment, a greater area or portion of the contact surface/friction interface 530 is provided by surfaces of the friction ring 500 at the radially outward periphery of the friction ring 500 in the illustrated compressed configuration than in the uncompressed configuration (FIG. 18B).

Thus, in an example embodiment, a cutting tool includes: a cutting tool body that is generally symmetrically formed about a central longitudinal axis of the cutting tool (e.g., at all or substantially all, or some, locations therealong), the cutting tool body including a cutting head at a distal end portion of the cutting tool, the cutting head including a cutting member (at an axial forward end of the cutting head), and a shank axially rearward of and connected to the cutting head, the shank including a retaining groove provided therein (at a generally proximal portion of the shank); and a friction ring disposed (/positioned/seated/secured) within the retaining groove. In example embodiments, the cutting tool further includes a retainer ring (e.g., a wedding band style retainer ring) secured about the friction ring (and partially within the retaining groove). In example embodiments, the shank exclusive of the retaining groove has a diameter that is less than an outer diameter of the retainer ring when the retainer ring is secured (/compressed/installed) about the friction ring. In example embodiments, the shank exclusive of the retaining groove has a diameter that is greater than an outer diameter of the friction ring when the friction ring is compressed by the retainer ring installed thereabout. The cutting member comprises, for example, polycrystalline diamond (PCD) or polycrystalline cubic boron nitride (PcBN). In example embodiments, the retaining groove has a diameter that is from 50 to 75% of a diameter of the shank exclusive of (and adjacent to) the retaining groove. The friction ring can comprise (or consist of) nylon, neoprene, polyurethane, rubber, epoxy resin, foam, or a combination thereof. In example embodiments, the friction ring (e.g., 60 D abrasion resistant urethane) has a coefficient of friction greater than that of the retainer ring (e.g., made of spring steel). In example embodiments, the friction ring has an outer diameter, when the friction ring is compressed by the retainer ring installed thereabout, that is from 15 to 20 mm. In example embodiments, the friction ring has a (radial) thickness ranging from 30 percent to 120 percent of a depth of the retaining groove.

Thus, in an example embodiment, a cutting tool assembly includes: a cutting tool holder having a central, longitudinal axis (A-A); and a cutting tool at least partially disposed (and secured) within a substantially cylindrical chamber (e.g., a bored recess) of the cutting tool holder, the cutting tool including a cutting tool body—including a cutting head at a distal end portion of the cutting tool, the cutting head including a cutting member (at an axial forward end of the cutting head), and a shank axially rearward of and connected to the cutting head, the shank including a retaining groove provided therein (e.g., at a proximal portion of the shank)—a friction ring positioned (and secured) within the retaining groove, and a retainer ring (e.g., a wedding band style retainer ring) secured about the friction ring (and, in example embodiments/implementations, partially within the retaining groove). In example embodiments, the cutting tool assembly further includes: a washer fitted about the shank and positioned against or adjacent to a base portion of the tool, the washer and the cutting tool holder being configured (e.g., with complementary surfaces) for establishing and maintaining alignment of the cutting tool body with the cutting tool holder (when the body is disposed/positioned/secured within the holder). The retainer ring is shaped and configured to secure the friction ring in the retaining groove. In example embodiments, the retainer ring is partially disposed within the retaining groove. In example embodiments, the cutting tool assembly is configured such that a frictional resistance provided by the friction ring in combination with the retainer ring is greater than that (the frictional resistance) provided by the retainer ring alone (positioned/secured about the shank). In example embodiments, the shank, the friction ring, the retainer ring and the cutting tool holder are (respectively sized and/or shaped and) configured such that the cutting tool body is (supported by and) rotatable within the cutting tool holder (i.e., about the central, longitudinal axis (A-A)) with the retainer ring bearing against an inside wall of the cutting tool holder (imparting frictional resistance to rotational movement of the cutting tool body in relation to the holder slowing the rotational speed of the tool—e.g., slowing tool rotation speed by 25-50% which could increase the useful tool life by potentially 25-50%). In example embodiments, the shank, the friction ring, the retainer ring and the cutting tool holder are (respectively sized and/or shaped and) configured such that the retainer ring is fixed or secured in position in relation to an inside wall of the cutting tool holder and compressed sufficiently tightly about the friction ring to prevent the cutting tool body from rotating within the holder (e.g., providing an indexable cutting tool). In example embodiments, the shank, the friction ring, the retainer ring and the cutting tool holder are (respectively sized and/or shaped and) configured such that an outer periphery (i.e., radially outward periphery) of the friction ring is compressed radially inwardly when the shank is in the holder—this radially inward compression being substantially uniform in magnitude (at different locations) along the radially outward periphery. In example embodiments, the shank, the friction ring, the retainer ring and the cutting tool holder are (respectively sized and/or shaped and) configured such that the friction ring provides sufficient frictional resistance against rotation of the cutting tool in relation to the cutting tool holder that, in its effect on the cutting tool, ranges from preventing free-spinning to fixed (i.e., preventing rotation). In example embodiments, the cutting tool, the friction ring, the retainer ring and the cutting tool holder are configured such that the friction ring provides frictional resistance resulting in greater than 0.1 ft-lb torque applied to the cutting tool being required to rotate the cutting tool within and in relation to the cutting tool holder. In example embodiments, the friction ring is made of a resilient (and/or structurally reconfigurable) material or materials and is provided in the form of axially interconnected (e.g., integrally formed) structures (e.g., toroidal or donut shaped) each of which is circumferentially disposed about the shank (within the retaining groove). In example embodiments, the friction ring (e.g., provided in the form generally of a C-shaped split ring) is made of a resilient (and/or structurally reconfigurable) material or materials and is provided in the form of circumferentially interconnected (e.g., integrally formed) axial structures which are sequentially axially disposed about the shank. By way of example, the circumferentially interconnected axial structures can be generally X-shaped inclusive of radially outwardly biased spring portions, generally D-shaped inclusive of radially outwardly biased spring portions and axially extending channels (or hollow portions) defined by each of the structures respectively, or radial protrusions (and/or other structures) that are biased to maintain/return to a radially outwardly directed (and/or uncompressed) shape.

The friction rings described herein embody (different examples of) a braking apparatus 130 for a cutting tool assembly with a rotatable cutting tool and a cutting tool holder.

Thus, in an example embodiment, a braking apparatus (for a cutting tool assembly with a rotatable cutting tool and a cutting tool holder) includes: a resilient rotation limiting structure configured to be fitted (about and) within a retaining groove (e.g., an annular groove) of the rotatable cutting tool and compressibly secured therein by a retaining structure disposed at an outer periphery of the resilient rotation limiting structure such that the resilient rotation limiting structure is outwardly radially self-biased causing the retaining structure to bear against an inside wall (or other interior portion) of the cutting tool holder imparting frictional resistance to rotational movement of the rotatable cutting tool within and in relation to the holder (e.g., slowing the rotational speed of the tool). The resilient rotation limiting structure is configured such that, for example, additional portions of the structure reposition to the outer periphery (of the resilient rotation limiting structure) as the retaining structure is disposed to increase compression of the resilient rotation limiting structure—or the outer periphery inwardly repositions responsive to increased compression such that additional (repositioning) portions of the structure become part of the outer periphery. The resilient rotation limiting structure includes, for example, a generally ring-shaped structure provided in the form of axially interconnected (e.g., integrally formed) toroidal or donut shaped structures which are sequentially circumferentially disposed (e.g., parallel in their respective planes) from side to side laterally across the generally ring-shaped structure. In example embodiments, the resilient rotation limiting structure includes a generally ring-shaped structure provided in the form of circumferentially interconnected (e.g., integrally formed) axial structures which are sequentially axially disposed moving circumferentially along an outer periphery of the generally ring-shaped structure. By way of example, the circumferentially interconnected axial structures can be generally X-shaped inclusive of radially outwardly biased spring portions, generally D-shaped inclusive of radially outwardly biased spring portions and axially extending channels (or hollow portions) defined by each of the structures respectively, or radial protrusions that are (radially outwardly biased and) sequentially equidistantly positioned along an outer periphery of the generally ring-shaped structure.

While example embodiments have been described herein, it should be apparent, however, that various modifications, alterations and adaptations to those embodiments may occur to persons skilled in the art with the attainment of some or all of the advantages of the subject matter described herein. The disclosed embodiments are therefore intended to include all such modifications, alterations and adaptations without departing from the scope and spirit of the technologies and methodologies as described herein.

What is claimed is:

1. A cutting tool comprising:

a cutting tool body that is generally symmetrically formed about a central longitudinal axis of the cutting tool, the cutting tool body including a cutting head at a distal end portion of the cutting tool, the cutting head including a cutting member;

a shank axially rearward of and connected to the cutting head, the shank including a retaining groove provided therein;

a friction ring disposed within the retaining groove; and a retainer ring secured about the friction ring, wherein the shank exclusive of the retaining groove has a diameter that is greater than an outer diameter of the friction ring when the friction ring is compressed by the retainer ring installed thereabout.

2. The cutting tool of claim 1, wherein the shank exclusive of the retaining groove has a diameter that is less than an outer diameter of the retainer ring when the retainer ring is secured about the friction ring.

3. The cutting tool of claim 1, wherein the cutting member comprises polycrystalline diamond (PCD) or polycrystalline cubic boron nitride (PcBN).

4. The cutting tool of claim 1, wherein the retaining groove has a diameter that is from 50 to 75% of a diameter of the shank exclusive of and adjacent to the retaining groove.

5. The cutting tool of claim 1, wherein the friction ring comprises nylon, neoprene, polyurethane, rubber, epoxy resin, foam, or a combination thereof.

6. A cutting tool, comprising:

a cutting tool body that is generally symmetrically formed about a central longitudinal axis of the cutting tool, the cutting tool body including a cutting head at a distal end portion of the cutting tool, the cutting head including a cutting member;

a shank axially rearward of and connected to the cutting head, the shank including a retaining groove provided therein;

a friction ring disposed within the retaining groove; and a retainer ring secured about the friction ring, wherein the friction ring has a coefficient of friction greater than that of the retainer ring.

7. The cutting tool of claim 1, wherein the friction ring has an outer diameter, when the friction ring is compressed by the retainer ring installed thereabout, that is from 15 to 20 mm.

8. The cutting tool of claim 1, wherein the friction ring has a radial thickness ranging from 30 percent to 120 percent of a depth of the retaining groove.

9. A cutting tool assembly comprising:
- a cutting tool holder having a central longitudinal axis; and
- a cutting tool at least partially disposed within a substantially cylindrical chamber of the cutting tool holder, the cutting tool including
- a cutting tool body including
- a cutting head at a distal end portion of the cutting tool, the cutting head including a cutting member, and
- a shank axially rearward of and connected to the cutting head, the shank including a retaining groove provided therein at a proximal portion of the shank,
- a friction ring positioned within the retaining groove, and
- a retainer ring secured about the friction ring,
- wherein the retainer ring is partially disposed within the retaining groove.

10. The cutting tool assembly of claim 9, further comprising: a washer fitted about the shank and positioned against or adjacent to a base portion of the tool, the washer and the cutting tool holder being configured for establishing and maintaining alignment of the cutting tool body with the cutting tool holder.

11. The cutting tool assembly of claim 9, wherein the retainer ring is shaped and configured to secure the friction ring in the retaining groove.

12. The cutting tool assembly of claim 9, wherein the cutting tool assembly is configured such that a frictional resistance provided by the friction ring in combination with the retainer ring is greater than that provided by the retainer ring alone.

13. The cutting tool assembly of claim 9, wherein the shank, the friction ring, the retainer ring and the cutting tool holder are configured such that the cutting tool body is supported by and rotatable within the cutting tool holder about the central longitudinal axis with the retainer ring bearing against an inside wall of the cutting tool holder.

14. The cutting tool assembly of claim 9, wherein the shank, the friction ring, the retainer ring and the cutting tool holder are configured such that the retainer ring is fixed or secured in position in relation to an inside wall of the cutting tool holder and compressed sufficiently tightly about the friction ring to prevent the cutting tool body from rotating within the holder.

15. The cutting tool assembly of claim 9, wherein the shank, the friction ring, the retainer ring and the cutting tool holder are configured such that an outer periphery of the friction ring is compressed radially inwardly when the stank is in the holder.

16. The cutting tool assembly of claim 9, wherein the cutting tool, the friction ring, the retainer ring and the cutting tool holder are configured such that the friction ring provides sufficient frictional resistance against rotation of the cutting tool in relation to the cutting tool holder that ranges from preventing free-spinning to fixed.

17. The cutting tool assembly of claim 9, wherein the cutting tool, the friction ring, the retainer ring and the cutting tool holder are configured such that the friction ring provides frictional resistance resulting in greater than 0.1 ft-lb torque applied to the cutting tool being required to rotate the cutting tool within and in relation to the cutting tool holder.

18. The cutting tool assembly of claim 9, wherein the friction ring is made of a resilient material or materials and is provided in the form of axially interconnected structures each of which is circumferentially disposed about the shank within the retaining groove.

19. The cutting tool assembly of claim 18, wherein the axially interconnected structures are toroidal or donut shaped.

20. The cutting tool assembly of claim 9, wherein the friction ring is made of a resilient material or materials and is provided in the form of circumferentially interconnected axial structures which are sequentially axially disposed about the shank within the retaining groove.

21. The cutting tool assembly of claim 20, wherein the circumferentially interconnected axial structures are generally X-shaped inclusive of radially outwardly biased spring portions.

22. The cutting tool assembly of claim 20, wherein the circumferentially interconnected axial structures are generally D-shaped inclusive of radially outwardly biased spring portions and axially extending channels defined by each of the structures respectively.

23. The cutting tool assembly of claim 20, wherein the circumferentially interconnected axial structures are radial protrusions that are biased to maintain/return to a radially outwardly directed shape.

24. A braking apparatus for a cutting tool assembly with a rotatable cutting tool and a cutting tool holder, the braking apparatus comprising:
- a resilient rotation limiting structure configured to be fitted within a retaining groove of the rotatable cutting tool and compressibly secured therein by a retaining structure disposed at an outer periphery of the resilient rotation limiting structure such that the resilient rotation limiting structure is outwardly radially self-biased causing the retaining structure to bear against an inside wall of the cutting tool holder imparting frictional resistance to rotational movement of the rotatable cutting tool within the holder,
- wherein the resilient rotation limiting structure is configured such that additional portions of the structure reposition to be at the outer periphery of the resilient rotation limiting structure as the retaining structure is disposed to increase compression of the resilient rotation limiting structure.

25. The braking apparatus of claim 24, wherein the resilient rotation limiting structure includes a generally ring-shaped structure provided in the form of axially interconnected toroidal or donut shaped structures which are sequentially circumferentially disposed from side to side laterally across the generally ring-shaped structure.

26. The braking apparatus of claim 24, wherein the resilient rotation limiting structure includes a generally ring-shaped structure provided in the form of circumferentially interconnected axial structures which are sequentially axially disposed moving circumferentially along an outer periphery of the generally ring-shaped structure.

27. The braking apparatus of claim 26, wherein the circumferentially interconnected axial structures are generally X-shaped inclusive of radially outwardly biased spring portions.

28. The braking apparatus of claim 26, wherein the circumferentially interconnected axial structures are generally D-shaped inclusive of radially outwardly biased spring portions and axially extending channels defined by each of the structures respectively.

29. The braking apparatus of claim 26, wherein the circumferentially interconnected axial structures are radial protrusions that are sequentially equidistantly positioned along an outer periphery of the generally ring-shaped structure.

* * * * *